(12) United States Patent
Northam et al.

(10) Patent No.: US 11,702,896 B2
(45) Date of Patent: Jul. 18, 2023

(54) FLOW MEASUREMENT APPARATUS AND ASSOCIATED SYSTEMS AND METHODS

(71) Applicant: WEATHERFORD TECHNOLOGY HOLDINGS, LLC, Houston, TX (US)

(72) Inventors: Paul R. Northam, Houston, TX (US); Walter S. Dillard, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 17/193,149

(22) Filed: Mar. 5, 2021

(65) Prior Publication Data

US 2022/0282586 A1 Sep. 8, 2022

(51) Int. Cl.
*E21B 21/08* (2006.01)
*E21B 21/10* (2006.01)

(52) U.S. Cl.
CPC .............. *E21B 21/08* (2013.01); *E21B 21/10* (2013.01)

(58) Field of Classification Search
CPC ........... E21B 47/01; E21B 21/08; E21B 21/10
See application file for complete search history.

(56) References Cited

U.S. PATENT DOCUMENTS

| | | | |
|---|---|---|---|
| 5,297,426 A | 3/1994 | Kane et al. | |
| 5,359,881 A | 11/1994 | Kalotay et al. | |
| 5,661,232 A | 8/1997 | Van Cleve et al. | |
| 7,606,636 B2 | 10/2009 | Dykstra | |
| 7,819,022 B2 | 10/2010 | Hope | |
| 9,388,650 B2 | 7/2016 | Leuchtenberg | |
| 9,995,098 B2 | 6/2018 | Brana et al. | |
| 10,227,838 B2 | 3/2019 | Dillard et al. | |
| 10,527,178 B2 | 1/2020 | Tuineag et al. | |
| 10,598,527 B2 | 3/2020 | Dillard et al. | |
| 10,712,190 B1 | 7/2020 | Parker et al. | |
| 10,738,552 B1 | 8/2020 | Parker et al. | |
| 10,859,415 B2 | 12/2020 | Munro | |
| 2013/0133948 A1* | 5/2013 | Lovorn | E21B 21/08 175/24 |

(Continued)

FOREIGN PATENT DOCUMENTS

| | | |
|---|---|---|
| EP | 0540079 A1 | 5/1993 |
| WO | 2011/151445 A2 | 12/2011 |

(Continued)

OTHER PUBLICATIONS

Specification for U.S. Appl. No. 17/391,159, filed Aug. 2, 2021, 23 pages.

(Continued)

*Primary Examiner* — Brad Harcourt
(74) *Attorney, Agent, or Firm* — Smith IP Services, P.C.

(57) ABSTRACT

A flow measurement apparatus can include a main flow passage, a variable flow restrictor, a bypass flow passage having an inlet connected with the main flow passage upstream of the variable flow restrictor and an outlet connected with the main flow passage downstream of the variable flow restrictor, and a mass flowmeter connected in the bypass flow passage between the inlet and the outlet. A method can include connecting a flow measurement apparatus, so that a fluid flow in a well also flows through the flow measurement apparatus, and varying a restriction to the fluid flow through the variable flow restrictor in response to a change in a flow rate of the fluid flow.

32 Claims, 5 Drawing Sheets

(56) References Cited

U.S. PATENT DOCUMENTS

| | | |
|---|---|---|
| 2014/0005957 A1 | 1/2014 | Pihlaja |
| 2015/0152700 A1 | 7/2015 | Lovorn et al. |
| 2016/0084024 A1 | 3/2016 | Dillard et al. |
| 2016/0138351 A1* | 5/2016 | Dillard .................. E21B 21/106 175/25 |
| 2016/0194927 A1 | 7/2016 | Dillard et al. |
| 2017/0328151 A1 | 11/2017 | Dillard et al. |
| 2018/0128294 A1* | 5/2018 | Sundararajan ............ F16K 3/26 |
| 2019/0106963 A1 | 4/2019 | Gray et al. |
| 2019/0234776 A1 | 8/2019 | Dillard et al. |
| 2020/0190939 A1* | 6/2020 | Gray ....................... E21B 34/04 |
| 2020/0191626 A1 | 6/2020 | Lacrosse |
| 2022/0065099 A1* | 3/2022 | Johnson ................ E21B 21/085 |

FOREIGN PATENT DOCUMENTS

| | | |
|---|---|---|
| WO | 20110151445 A2 | 12/2011 |
| WO | 2014/007797 A1 | 1/2014 |

OTHER PUBLICATIONS

Drawings for U.S. Appl. No. 17/391,159, filed Aug. 2, 2021, 3 pages.

Kedar M Deshpande, et al.; "Multiphase Flow Modeling of Surface Equipment in Managed Pressure Drilling Operations", SPE-170654-MS, dated Oct. 27-29, 2014, 10 pages.

International Search Report with Written Opinion dated May 2, 2022 for PCT Patent Application No. PCT/US2022/014182, 12 pages.

Deshpande, Kedar M. et al; "Multiphase Flow Modeling of Surface Equipment in Managed Pressure Drilling Operations", SPE-170654-MS, dated Oct. 27-29, 2014, 10 pages.

* cited by examiner

FLOW MEASUREMENT APPARATUS AND ASSOCIATED SYSTEMS AND METHODS

BACKGROUND

This disclosure relates generally to equipment utilized and operations performed in conjunction with a subterranean well and, in examples described below, more particularly provides a flow measurement apparatus and associated systems and methods.

In various types of well operations, it can be important to accurately measure characteristics of fluid flow through the well. For example, in a managed pressure drilling operation, a mass flow rate of fluid into and out of the well is one of the fundamental bases for determining whether an influx or fluid loss is occurring. Characteristics of fluid flow in a well are also important for operations such as well control.

Therefore, it will be appreciated that improvements are continually needed in the art of measuring characteristics of fluid flow. These improvements may be useful in managed pressure drilling, well control and a variety of other types of well operations.

DETAILED DESCRIPTION

Figure 1:
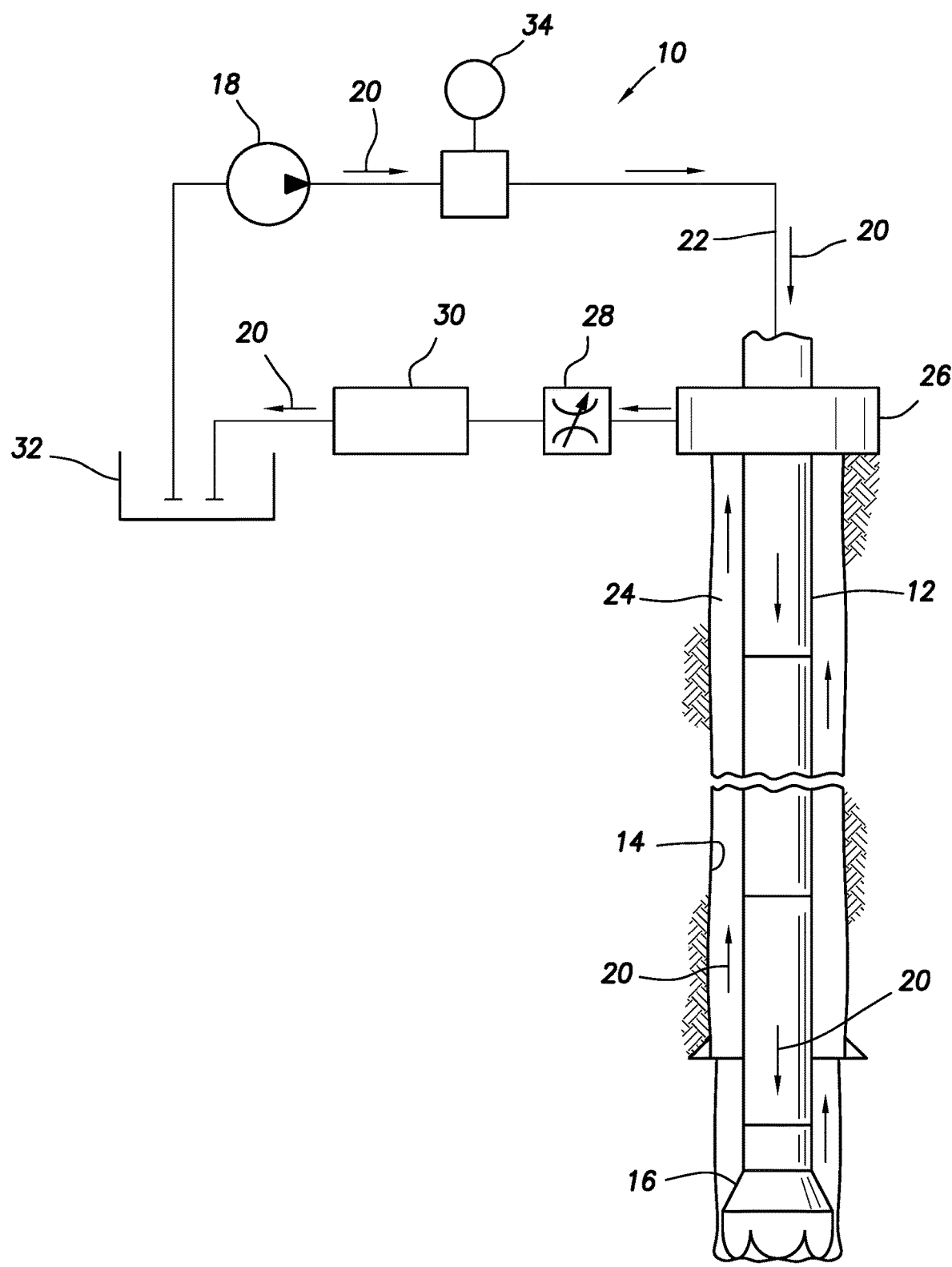
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is positioned in a wellbore 14. The tubular string 12 is a drill string having a drill bit 16 connected at a distal end thereof for the purpose of drilling into the earth. In other examples, the tubular string 12 could be a work string, a stimulation string, a completion string, an injection string, a production string, or another type of tubular string. The scope of this disclosure is not limited to use of any particular type of tubular string in a well, or to use of a tubular string at all.

As depicted in FIG. 1, a pump 18 is used to maintain a fluid flow 20 through the tubular string 12 in the wellbore 14. In this example, the fluid flow 20 enters the tubular string 12 at the surface via a standpipe 22, which may be connected to the tubular string via a top drive, a kelly, or other equipment (not shown). The fluid flow 20 exits the tubular string 12 in the wellbore 14 via nozzles (not shown) in the drill bit 16.

The fluid flow 20 returns to the surface via an annulus 24 formed between the tubular string 12 and the wellbore 14. In managed pressure drilling operations, the annulus 24 may be isolated from the atmosphere at the surface by well equipment 26 known to those skilled in the art as a rotating control device, rotating drilling head, rotating blowout preventer, rotating control head, etc. In well control operations, the well equipment 26 may be an annular blowout preventer, pipe rams, or other equipment. However, the scope of this disclosure is not limited to use of any well equipment to isolate an annulus from the atmosphere at the surface.

The returned fluid flow 20 may pass through a choke manifold 28 and various types of fluid conditioning equipment 30 (such as, a gas separator, a shale shaker, etc.) prior to flowing into a reservoir 32 (also known as a "mud pit"). The pump 18 draws fluid from the reservoir 32. Note that the FIG. 1 example is simplified for purposes of clarity of illustration and description, and those skilled in the art will appreciate that additional equipment or different equipment may be used, depending in part on the particular well operation being performed.

In the FIG. 1 example, a flow measurement apparatus 34 is connected between the pump 18 and the tubular string 12. Thus, the fluid flow 20 exiting the pump 18 passes through the flow measurement apparatus 34 and the standpipe 22 prior to entering the tubular string 12. In this manner, characteristics of the fluid flow 20 (such as, mass flow rate, density, etc.) can be accurately measured as it is being introduced into the well. In some examples, another flow measurement apparatus (or another type of flow measurement apparatus) may also measure characteristics of the fluid flow 20 after it exits the well (such as, a flowmeter connected downstream of the choke manifold 28).

In the FIG. 1 example, the pump 18 may be of the type known as a triplex pump or rig pump. Fluid pressure downstream of the pump 18 can in some cases be relatively high. In particular, the fluid pressure can be greater than a pressure rating of a conventional mass flowmeter of the type that is designed to be connected in a main flow line (such as, downstream of the choke manifold 28).

The flow measurement apparatus 34 in the system 10 of FIG. 1 instead uses a mass flowmeter connected in a bypass flow passage, which is connected in parallel with a main flow passage. In this manner, a mass flowmeter having a greater pressure rating can be used.

However, at relatively low flow rates, the measurements output by the mass flowmeter may become undesirably inaccurate. In order to improve the accuracy of the measurements output by the mass flowmeter, the flow measurement apparatus 34 includes features that enable the flow rate through the bypass flow passage to be maintained above a level that provides measurements with acceptable accuracy, even though the flow rate through the main flow passage decreases.

Figure 2:
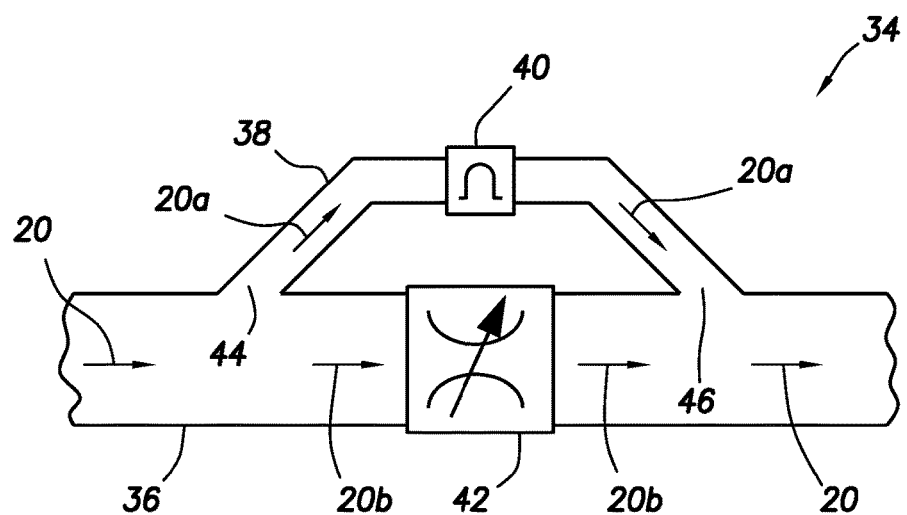
FIG. 2 is a representative schematic view of an example of a flow measurement apparatus that may be used with the FIG. 1 system and method.

Referring additionally now to FIG. 2, a schematic view of an example of the flow measurement apparatus 34 is representatively illustrated. The FIG. 2 flow measurement apparatus 34 may be used with the system 10 and method of FIG. 1, or it may be used with other systems and methods.

In the FIG. 2 example, the flow measurement apparatus 34 includes a main flow passage 36 and a bypass flow passage 38 connected in parallel with the main flow passage. A mass flowmeter 40 (such as, a Coriolis flowmeter) is connected in the bypass flow passage 38. A variable flow restrictor 42 is connected in the main flow passage 36.

An inlet 44 of the bypass flow passage 38 is connected to the main flow passage 36 upstream of the variable flow restrictor 42. An outlet 46 of the bypass flow passage 38 is connected to the main flow passage 36 downstream of the variable flow restrictor 42. Thus, a portion 20a of the fluid flow 20 enters the bypass flow passage 38 via the inlet 44 upstream of the variable flow restrictor 42, flows through the mass flowmeter 40, and then flows back into the main flow passage 36 via the outlet 46 downstream of the variable flow restrictor.

If the flow rate of the fluid flow 20 in the main flow passage 36 decreases, so that the flow rate of the fluid flow portion 20a through the mass flowmeter 40 would decrease to an undesired level (e.g., resulting in unacceptably inaccurate measurement outputs), a restriction to flow through the variable flow restrictor 42 can be increased to thereby divert a greater proportion of the fluid flow to the bypass flow passage 38. Conversely, if the flow rate of the fluid flow 20 in the main flow passage 36 increases, so that the flow rate of the fluid flow portion 20a through the mass flowmeter 40 increases above a desired level, a restriction to flow through the variable flow restrictor 42 can be decreased to thereby decrease the proportion of the fluid flowing through the bypass flow passage 38.

It is beneficial in such situations to be able to precisely adjust the restriction to flow through the variable flow restrictor 42, so that accurate calculations of the flow rate of the fluid flow 20 can be made, based on the flow rate measurements output by the mass flowmeter 40. Examples of the variable flow restrictor 42 described below provide for such precise adjustments of the flow restriction.

Figures 3A, 3B:
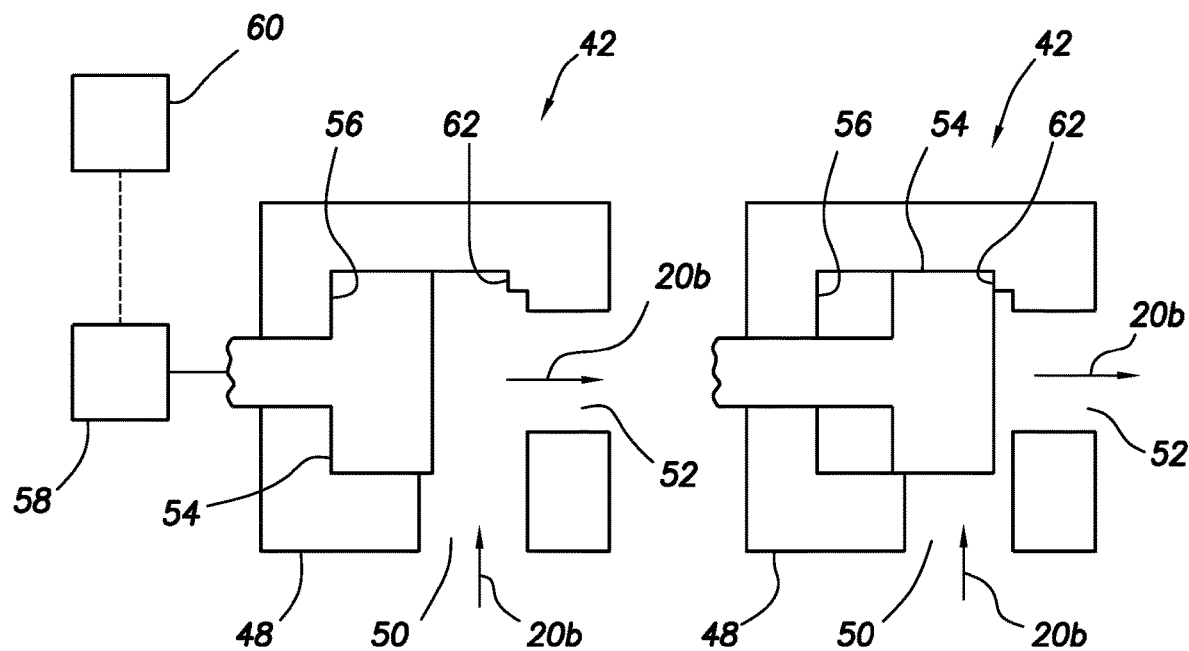
FIGS. 3A & B are representative partially cross-sectional views of an example of a variable flow restrictor that may be used in the FIG. 2 flow measurement apparatus, the variable flow restrictor being shown in respective less restrictive and more restrictive configurations.

Referring additionally now to FIGS. 3A & B, an example of the variable flow restrictor 42 is representatively illustrated in respective less restricted and more restricted configurations. The FIGS. 3A & B variable flow restrictor 42 may be used in the FIG. 2 flow measurement apparatus 34, or it may be used in other flow measurement apparatus.

In FIG. 3A, it may be seen that the fluid flow portion 20b enters a body 48 of the variable flow restrictor 42 via an inlet 50. The fluid flow portion 20b exits the body 48 via an outlet 52.

A flow restrictor member 54 is positioned in the body 48. As depicted in FIG. 3A, the flow restrictor member 54 is contacting a shoulder 56 formed in the body 48. By abutting the flow restrictor member 54 against the shoulder 56, a known, reproducible restriction to the flow of the fluid flow portion 20b through the variable flow restrictor 42 is produced.

The flow restrictor member 54 is displaceable in the body 48 by means of an actuator 58. The actuator 58 may be any type of actuator (such as, electric, hydraulic, etc.). Operation of the actuator 58 may be controlled by a controller 60.

In one example, the controller 60 can receive from the mass flowmeter 40 indications of the flow rate of the fluid flow portion 20a through the bypass flow passage 38. If it appears that the flow rate will decrease below an acceptable level, the controller 60 can operate the actuator 58 to thereby displace the flow restrictor member 54 to the more restrictive configuration depicted in FIG. 3B. Conversely, if it appears that the flow rate has increased sufficiently above the acceptable level, the controller 60 can operate the actuator 58 to thereby displace the flow restrictor member 54 to the less restrictive configuration depicted in FIG. 3A. However, the scope of this disclosure is not limited to the controller 60 receiving flow rate indications from the mass flowmeter 40, or to the controller displacing the flow restrictor member 54 in any particular manner in response to any particular flow rate indications.

In FIG. 3B, the flow restrictor member 54 has been displaced by the actuator 58 to a position in the body 48 in which the flow restrictor member contacts another shoulder 62. By abutting the flow restrictor member 54 against the shoulder 62, another known, reproducible restriction to the flow of the fluid flow portion 20b through the variable flow restrictor 42 is produced.

Thus, the flow restrictor member 54 is displaced in one direction by the actuator 58 into contact with the shoulder 56 when a known, reproducible, less restrictive configuration of the variable flow restrictor 48 is desired, and the flow restrictor member is displaced in an opposite direction by the actuator into contact with the shoulder 62 when a known, reproducible, more restrictive configuration of the variable flow restrictor 48 is desired.

Figure 4:
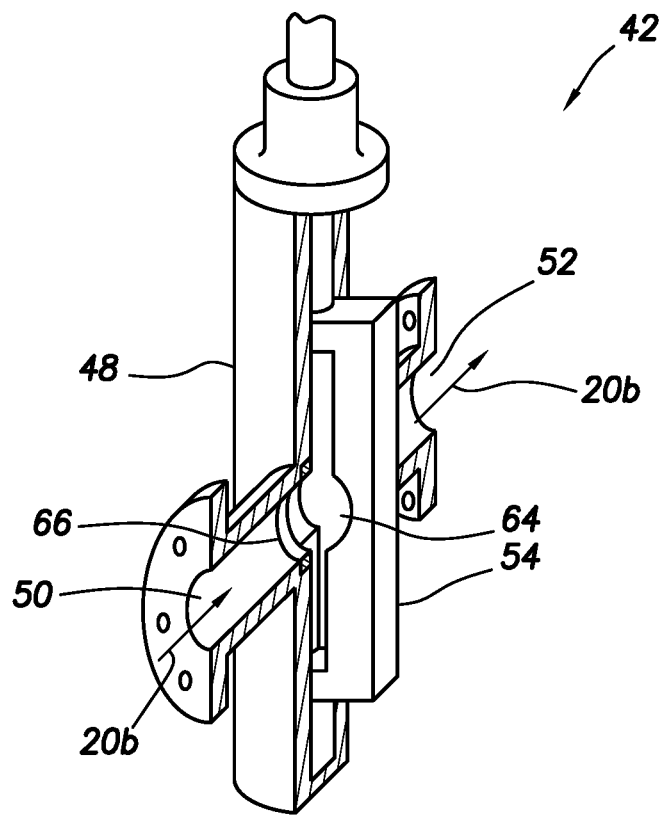
FIG. 4 is a representative perspective and partially cross-sectional view of another example of the variable flow restrictor.
Figure 5:
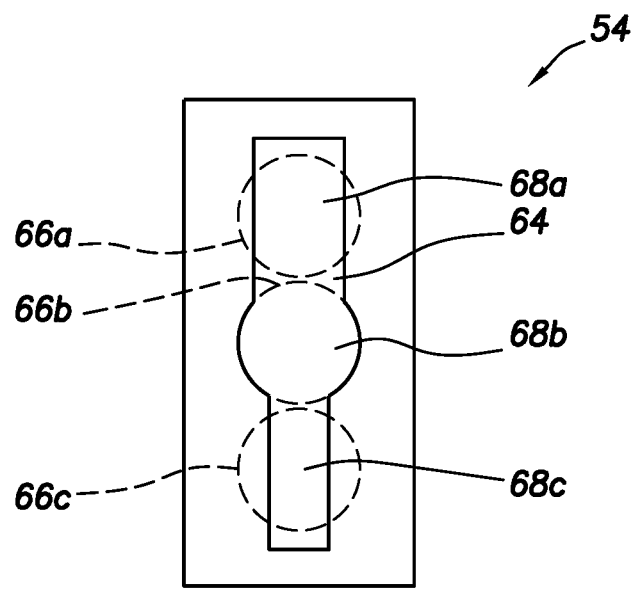
FIG. 5 is a representative elevational view of an example of a flow restrictor member of the variable flow restrictor.

Referring additionally now to FIGS. 4 & 5, another example of the variable flow restrictor 42 is representatively illustrated. The flow restrictor member 54 of the FIG. 4 variable flow restrictor 42 is separately depicted in FIG. 5.

In FIG. 4 it may be seen that the fluid flow portion 20b enters the body 48 of the variable flow restrictor 42 via the inlet 50, flows through an opening 64 formed through the flow restrictor member 54, and exits via the outlet 52. In this example, annular seats 66 (only one of which is visible in FIG. 4) engage the flow restrictor member 54 on opposite sides thereof.

The flow restrictor member 54 can be displaced in the body 48 between different discrete positions by an actuator, such as the actuator 58 described above. The restriction to the fluid flow 20b is different at each of the respective different positions. However, the flow restrictor member 54 is configured so that the flow restriction is relatively insensitive to small variations in the position of the flow restrictor member.

In FIG. 5 it may be seen that an inner diameter of the seat 66 can have certain positions relative to the flow restrictor member 54, which are indicated as 66a-c in FIG. 5. The opening 64 is configured so that an aperture 68a-c corresponding to each of the respective seat positions 66a-c has a flow area that does not change, or changes only slightly, due to relative displacement between the flow restrictor member 54 and the seat 66. Stated differently, each of the positions 66a-c can be displaced somewhat, without appreciably affecting the flow area or restriction to flow through the respective aperture 68a-c.

It will be appreciated from a careful consideration of FIG. 5 that, when the seat 66 is in the position 66a, so that the fluid flow 20b is passing through the aperture 68a, the flow area of the aperture 68a (and, thus, the restriction to the fluid flow 20b) will not change if the flow restrictor member 54 is displaced slightly upward or downward relative to the seat. In this example, this effect is due to the opening 64 being linearly elongated in the direction of the flow restrictor member 54 displacement. In another example, the flow restrictor member 54 could displace rotationally instead of linearly, in which case the opening 64 could be circumferentially elongated to produce a similar effect.

In the FIG. 5 example, when the seat 66 is in the position 66c, so that the fluid flow 20b is passing through the aperture 68c, the flow area of the aperture 68c (and, thus, the restriction to the fluid flow 20b) will not change if the flow restrictor member 54 is displaced slightly upward or downward relative to the seat. When the seat 66 is in the position 66b, so that the fluid flow 20b is passing through the aperture 68b, the flow area of the aperture 68b (and, thus, the restriction to the fluid flow 20b) will change only slightly if the flow restrictor member 54 is displaced slightly upward or downward relative to the seat.

Thus, the restriction to the fluid flow 20b through the FIG. 4 variable flow restrictor 42 can be accurately adjusted, without requiring correspondingly accurate positioning of the flow restrictor member 54. Some variation in the position of the flow restrictor member 54 can be permitted, without hindering the ability to produce known, reproducible restrictions to the fluid flow 20b. As described above and depicted in FIGS. 4 & 5, the flow restrictor member 54 is shiftable between a finite number of discrete flow-permitting positions having known, reproducible restrictions to flow.

Figure 6:
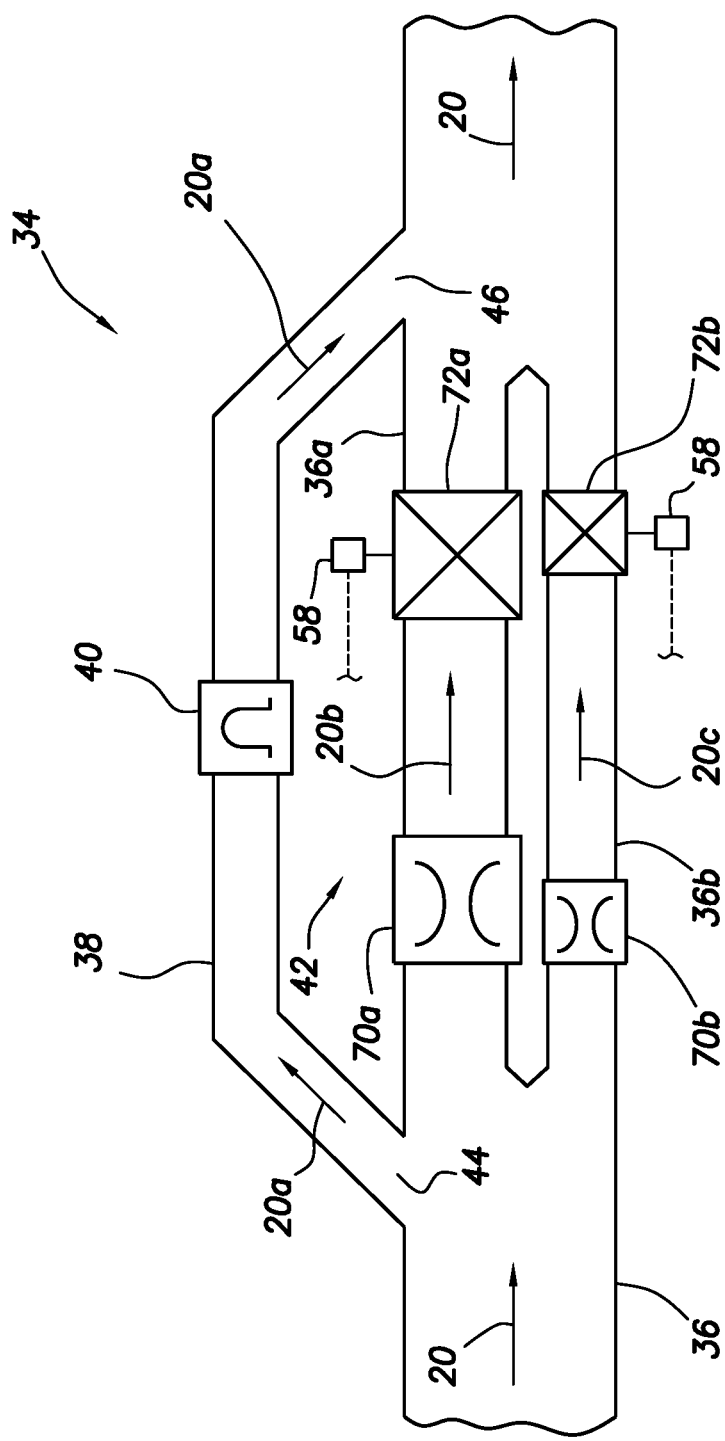
FIG. 6 is a representative schematic view of another example of the flow measurement apparatus.

Referring additionally now to FIG. 6, another example of the flow measurement apparatus 34 is representatively illustrated. In the FIG. 6 flow measurement apparatus 34, the variable flow restrictor 42 comprises multiple branches 36a,b of the main flow passage 36, with each of the branches having a fixed flow restrictor 70a,b (such as, an orifice, cone or venturi, etc.). The total restriction to flow through the variable flow restrictor 42 is adjusted by actuating flow control devices 72a,b to selectively permit or block flow through the respective branches 36a,b.

Although only two each of the branches 36a,b, flow restrictors 70a,b and flow control devices 72a,b are shown in FIG. 6, any number of these elements may be used in keeping with the principles of this disclosure. In addition, other configurations may be used (for example, it is not necessary for each branch to include a respective discrete flow restrictor and flow control device, at least one branch could be always open for fluid flow therethrough, etc.).

The flow restrictors 70a,b could be different (e.g., with one of the flow restrictors restricting fluid flow more than the other flow restrictor), or the flow restrictors could be the same. One or more of the flow restrictors 70a,b could be a variable flow restrictor (such as, the FIGS. 3A-4 variable flow restrictors) in some examples.

The flow control devices 72a,b may be valves having fully open and fully closed configurations, in which fluid flow through the valves is respectively unrestricted or completely prevented. In other examples, there may be some restriction to fluid flow through the flow control devices 72a,b in the open configuration and some fluid flow through the flow control devices in the closed configuration.

Separate actuators 58 may be used to operate the individual flow control devices 72a,b. The actuators 58 may be controlled by the controller 60 (see FIG. 3A) in response to changes in the flow rate of the fluid flow 20 through the main flow passage 36, or in response to changes in the flow rate of the portion 20a of the fluid flow through the bypass flow passage 38 (e.g., based on the measurements output by the mass flowmeter 40).

With both of the flow control devices 72a,b open as depicted in the FIG. 6 example, a portion 20b of the fluid flow 20 passes through the flow restrictor 70a and the flow control device 72a of the branch 36a, and another portion 20c of the fluid flow 20 passes through the flow restrictor 70b and the flow control device 72b of the branch 36b. The total restriction to flow through the variable flow restrictor 42 can be increased by closing either the flow control device 72a or the flow control device 72b, in order to increase the proportion of the fluid flow 20 that passes through the bypass flow passage 38 and the mass flowmeter 40.

The proportion of the fluid flow 20 that passes through the bypass flow passage 38 and the mass flowmeter 40 can be increased when the flow rate of the fluid flow 20 decreases, so that the flow rate of the fluid flow portion 20a through the mass flowmeter is maintained above a predetermined level. In this manner, the accuracy of the measurements output by the mass flowmeter 40 can be maintained, even when the flow rate of the fluid flow 20 decreases. Conversely, the proportion of the fluid flow 20 that passes through the bypass flow passage 38 and the mass flowmeter 40 can be decreased when the flow rate of the fluid flow 20 increases.

It will be appreciated that the FIG. 6 variable flow restrictor 42 provides for several known, reproducible restrictions to the fluid flow 20 through the main flow passage 36. The restriction to the fluid flow 20 through the main flow passage 36 will have one restriction level (e.g., Cv or flow coefficient) with both of the flow control devices 72a,b open, another level with the flow control device 72a closed, and yet another level with the flow control device 72b closed. Of course, even more known, reproducible restrictions to the fluid flow 20 through the main flow passage 36 can be provided by increasing the number of branches and associated flow restrictors and flow control devices.

Figure 7:
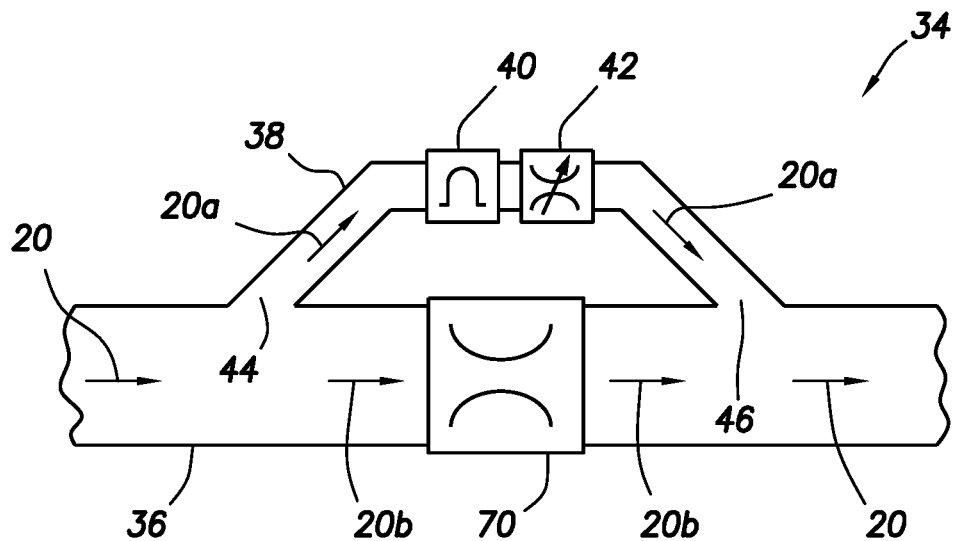
FIG. 7 is a representative schematic view of another example of the flow measurement apparatus.

Referring additionally now to FIG. 7, another example of the flow measurement apparatus 34 is representatively illustrated. The FIG. 7 flow measurement apparatus 34 is similar in many respects to the FIG. 2 flow measurement apparatus 34. However, in the FIG. 7 example, the variable flow restrictor 42 is connected in the bypass flow passage 38, and a fixed flow restrictor 70 (such as, an orifice, cone or venturi, etc.) is connected in the main flow passage 36 between the inlet 44 and the outlet 46.

The variable flow restrictor 42 may comprise any of the variable flow restrictors described herein. The variable flow restrictor 42 may be connected upstream or downstream (as depicted in FIG. 7) of the mass flowmeter 40.

The variable flow restrictor 42 can be varied between known, reproducible restriction levels (e.g., predetermined Cv's) to maintain the flow rate of the portion 20a of the fluid flow through the mass flowmeter 40 connected in the branch flow passage 38 in a range that produces acceptably accurate flow measurement outputs from the mass flowmeter. For example, if the flow rate of the fluid flow 20 decreases, the restriction to flow through the variable flow restrictor 42 can be decreased to thereby maintain the flow rate of the portion 20a of the fluid flow above a predetermined level that produces acceptably accurate outputs from the mass flowmeter 40. If the flow rate of the fluid flow 20 increases, the restriction to flow through the variable flow restrictor 42 can be increased to thereby reduce the flow rate of the portion 20a of the fluid flow, in order to limit wear, fatigue, etc. on the mass flowmeter 40.

In one example, the flow restrictor 70 can have a relatively low Cv (to produce a relatively large pressure drop in the main flow passage 36). At relatively high flow rates of the fluid flow 20, the variable flow restrictor 42 can be selected to have a relatively low Cv value to thereby limit the flow rate of the fluid flow portion 20a to an acceptable level, in order to limit wear, fatigue, etc. on the mass flowmeter 40.

Figure 8:
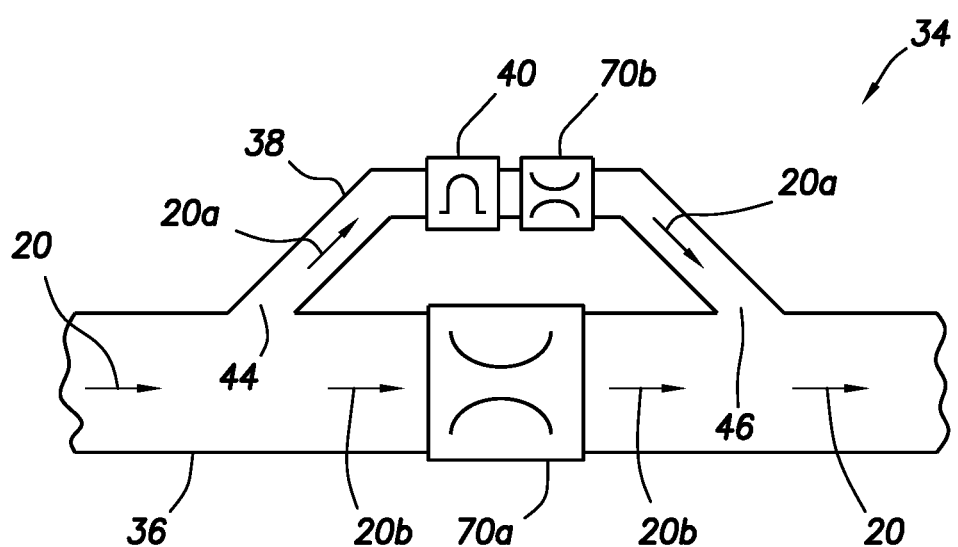
FIG. 8 is a representative schematic view of another example of the flow measurement apparatus.

Referring additionally now to FIG. 8, another example of the flow measurement apparatus 34 is representatively illustrated. The FIG. 8 flow measurement apparatus 34 is similar in many respects to the FIG. 7 flow measurement apparatus 34. However, in the FIG. 8 example, a fixed flow restrictor 70b is used in the bypass flow passage 38 in place of the variable flow restrictor 42. Another fixed flow restrictor 70a is used in the main flow passage 36.

The FIG. 8 flow measurement apparatus 34 is a less expensive alternative that may be useful for situations in which an appropriate combination of fluid pressures, flow rates and fluid properties are expected to be used. Specifically, the flow restrictors 70a,b are selected for a specific envelope of pressure and flow rate for a given non-Newtonian fluid.

In this example, the Cv of the flow restrictor 70a can be relatively low to produce a relatively high pressure drop in the main flow passage 36 between the inlet 44 and the outlet 46. At a maximum flow rate of the fluid flow 20 and a highest pressure drop across the flow restrictor 70a, the flow restrictor 70b limits the flow rate of the fluid flow 20a to an acceptable value, which reduces wear and tear on the mass flowmeter 40. At a given minimum flow rate (e.g., when the mass flowmeter 40 is a Coriolis type), the pressure drop across the mass flowmeter 40 surpasses the pressure drop across the flow restrictor 70b due to high fluid friction in the narrow bypass flow passage 38, so the flow restrictor 70b does not limit the fluid flow 20a at relatively low flow rates.

The FIG. 8 example is suitable for non-Newtonian fluids that possess a predetermined range of yield stress, and follow the Herschel Bulkley model:

$$T = T_O + kx^n \quad (1)$$

where T is the shear stress, x is the shear rate, $T_O$ is the yield stress, k is the consistency index, and n is the flow index.

It may now be fully appreciated that the above disclosure provides significant advancements to the art of measuring characteristics of fluid flow. In examples described above, a restriction to fluid flow 20 through a main flow passage 36 or a bypass flow passage 38 can be varied between known, reproducible restriction levels (e.g., predetermined Cv's), so that a flow rate of a portion 20a of the fluid flow through a mass flowmeter 40 connected in the branch flow passage 38 can be maintained in a range that corresponds to flow measurement outputs having desirable accuracy.

In one example, a method for use with a subterranean well can include connecting a flow measurement apparatus 34, so that a fluid flow 20 in the well also flows through the flow measurement apparatus 34. The flow measurement apparatus 34 comprises a main flow passage 36, a bypass flow passage 38, a variable flow restrictor 42, and a mass flowmeter 40. The bypass flow passage 38 has an inlet 44 and an outlet 46 connected with the main flow passage 36. The mass flowmeter 40 is connected between the inlet 44 and the outlet 46. The method includes varying a restriction to the fluid flow 20 through the variable flow restrictor 42 in response to a change in a flow rate of the fluid flow 20.

The connecting step may include connecting the flow measurement apparatus 34 between a pump 18 and a tubular string 12 (such as, a drill string).

The variable flow restrictor 42 may be connected in the main flow passage 36 between the inlet 44 and the outlet 46. The restriction varying step may include increasing the restriction to the fluid flow 20 through the variable flow restrictor 42 in response to a decrease in the flow rate of the fluid flow 20. The restriction varying step may include decreasing the restriction to the fluid flow 20 through the variable flow restrictor 42 in response to an increase in the flow rate of the fluid flow 20.

The variable flow restrictor 42 may be connected in the bypass flow passage 36 between the inlet 44 and the outlet 46. The restriction varying step may include decreasing the restriction to the fluid flow 20 through the variable flow restrictor 42 in response to a decrease in the flow rate of the fluid flow 20. The restriction varying step may include increasing the restriction to the fluid flow 20 through the variable flow restrictor 42 in response to an increase in the flow rate of the fluid flow 20.

The restriction varying step may include displacing a flow restrictor member 54 of the variable flow restrictor 42 until the flow restrictor member 54 contacts a first shoulder 62 in the variable flow restrictor 42.

The displacing step may include displacing the flow restrictor member 54 into contact with the first shoulder 62 in response to a decrease in the flow rate of the fluid flow 20.

The displacing step may include displacing the flow restrictor member 54 into contact with a second shoulder 56 in the variable flow restrictor 42 in response to an increase in the flow rate of the fluid flow 20.

The restriction varying step may include displacing a flow restrictor member 54 of the variable flow restrictor 42 from a first position to a second position, the fluid flow 20 passing through a first aperture 68a in the flow restrictor member 54 in the first position, and the fluid flow 20 passing through a second aperture 68b in the flow restrictor member 54 in the second position.

The variable flow restrictor 42 may include a flow restrictor member 54 with an opening 64 formed through the flow restrictor member 54. The opening 64 may have multiple different flow areas (corresponding with the apertures 68a-c) configured to align with the main flow passage 36, each of the flow areas having a respective different level of the restriction to the fluid flow 20 through the variable flow restrictor 42. The flow restrictor member 54 may be displaceable in the variable flow restrictor 42 without changing at least one of the flow areas.

A section of the main flow passage 36 may comprise multiple parallel branches 36a,b. The restriction varying step may include varying a restriction to the fluid flow 20 through at least one of the branches 36a,b.

The restriction varying step may include blocking the fluid flow 20 through at least one of the branches 36a,b in response to a decrease in the flow rate of the fluid flow 20. The restriction varying step may include increasing the fluid flow 20 through at least one of the branches 36a,b in response to an increase in the flow rate of the fluid flow 20.

The mass flowmeter 40 may comprise a Coriolis flowmeter.

Also provided to the art by the above disclosure is a flow measurement apparatus 34 for use with a subterranean well. In one example, the flow measurement apparatus 34 can include a main flow passage 36, a bypass flow passage 38 having an inlet 44 and an outlet 46 connected with the main flow passage 36, a variable flow restrictor 42 connected in the main flow passage 36 or in the bypass flow passage 38, and a mass flowmeter 40 connected in the bypass flow passage 38 between the inlet 44 and the outlet 46.

The variable flow restrictor 42 may include a flow restrictor member 54, and first and second shoulders 56, 62 formed in a body 48 of the variable flow restrictor 42. The variable flow restrictor 42 may have a first restriction to fluid flow 20 with the flow restrictor member 54 in contact with the first shoulder 62, and a second restriction to fluid flow 20 with the flow restrictor member 54 in contact with the second shoulder 56.

The variable flow restrictor 42 may include a flow restrictor member 54 and a seat 66. The variable flow restrictor 42 may have a first restriction to fluid flow 20 with the flow restrictor member 54 in a first position relative to the seat 66, and a second restriction to the fluid flow 20 with the flow restrictor member 54 in a second position relative to the seat 66.

An overlap of the seat 66 with the flow restrictor member 54 in the first position may form a first aperture 68a having the first restriction to the fluid flow 20, and the overlap of the seat 66 with the flow restrictor member 54 in the second position may form a second aperture 68b having the second restriction to the fluid flow 20.

The variable flow restrictor 42 may include a flow restrictor member 54 with an opening 64 formed through the flow restrictor member 54. The opening 64 may have multiple different flow areas (e.g., corresponding to the apertures 68a-c) configured to align with the main flow passage 36, each of the flow areas having a respective different level of restriction to the fluid flow 20 through the variable flow restrictor 42. The flow restrictor member 54 may be displaceable in the variable flow restrictor 42 without changing at least one of the flow areas.

A section of the main flow passage 36 may comprise multiple parallel branches 36a,b. A flow control device 72a,b may be connected in at least one of the branches 36a,b. The flow control device 72a,b may selectively permit and block fluid flow 20 through at least one of the branches 36a,b. The flow control device 72a,b may comprise a valve configured to block the fluid flow 20 through at least one of the branches 36a,b in response to a decrease in a flow rate of the fluid flow 20.

The variable flow restrictor 42 may be connected in the main flow passage 36 between the inlet 44 and the outlet 46. The variable flow restrictor 42 may be connected in the bypass flow passage 38 between the inlet 44 and the outlet 46.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method for use with a subterranean well, the method comprising:
   connecting a flow measurement apparatus, so that a fluid flow in the well also flows through the flow measurement apparatus, the flow measurement apparatus comprising a main flow passage, a bypass flow passage, a variable flow restrictor, and a mass flowmeter, the bypass flow passage having an inlet and an outlet connected with the main flow passage, and the mass flowmeter being connected in the bypass flow passage between the inlet and the outlet; and
   shifting a flow restrictor member of the variable flow restrictor between a finite number of discrete flow-permitting positions having known, reproducible restrictions to flow, thereby distributing flow between the main flow passage and the bypass flow passage so that a flow rate through the bypass flow passage is maintained within a desired range, in which the flow restrictor member is displaceable relative to a seat of the variable flow restrictor without changing a respective restriction to flow in at least one of the discrete flow-permitting positions.

2. The method of claim 1, in which the connecting comprises connecting the flow measurement apparatus between a pump and a drill string.

3. The method of claim 1, in which the variable flow restrictor is connected in the main flow passage between the inlet and the outlet.

4. The method of claim 3, in which the shifting comprises increasing the restriction to the fluid flow through the variable flow restrictor in response to a decrease in the flow rate of the fluid flow through the bypass flow passage.

5. The method of claim 3, in which the shifting comprises decreasing the restriction to the fluid flow through the variable flow restrictor in response to an increase in the flow rate of the fluid flow through the bypass flow passage.

6. The method of claim 1, in which the variable flow restrictor is connected in the bypass flow passage between the inlet and the outlet.

7. The method of claim 6, in which the shifting comprises decreasing the restriction to the fluid flow through the variable flow restrictor in response to a decrease in the flow rate of the fluid flow through the bypass flow passage.

8. The method of claim 6, in which the shifting comprises increasing the restriction to the fluid flow through the variable flow restrictor in response to an increase in the flow rate of the fluid flow through the bypass flow passage.

9. The method of claim 1, in which the shifting comprises displacing the flow restrictor member of the variable flow restrictor until the flow restrictor member contacts a first shoulder in the variable flow restrictor.

10. The method of claim 9, in which the displacing comprises displacing the flow restrictor member into contact with the first shoulder in response to a decrease in the flow rate of the fluid flow.

11. The method of claim 10, in which the displacing further comprises displacing the flow restrictor member into contact with a second shoulder in the variable flow restrictor in response to an increase in the flow rate of the fluid flow.

12. The method of claim 1, in which the shifting comprises displacing the flow restrictor member of the variable flow restrictor from a first position to a second position, the fluid flow passing through a first aperture in the flow restrictor member in the first position, and the fluid flow passing through a second aperture in the flow restrictor member in the second position.

13. The method of claim 1, in which the flow restrictor member comprises an opening formed through the flow restrictor member, the opening having multiple different flow areas configured to align with the main flow passage, each of the flow areas having a respective different level of restriction to the fluid flow through the variable flow restrictor.

14. The method of claim 13, in which the flow restrictor member is displaceable in the variable flow restrictor without changing at least one of the flow areas.

15. The method of claim 1, in which a section of the main flow passage comprises multiple parallel branches.

16. The method of claim 15, in which the distributing comprises varying a restriction to the fluid flow through at least one of the branches.

17. The method of claim 15, in which the distributing comprises blocking the fluid flow through at least one of the branches in response to a decrease in the flow rate of the fluid flow.

18. The method of claim 15, in which the distributing comprises increasing the fluid flow through at least one of the branches in response to an increase in the flow rate of the fluid flow.

19. The method of claim 1, in which the mass flowmeter comprises a Coriolis flowmeter.

20. A flow measurement apparatus for use with a subterranean well, the flow measurement apparatus comprising:
a main flow passage;
a bypass flow passage having an inlet and an outlet connected with the main flow passage;
a variable flow restrictor connected between the inlet and the outlet in a selected one of the main flow passage and the bypass flow passage, in which a flow restrictor member of the variable flow restrictor is configured to shift between a finite number of discrete flow-permitting positions having known, reproducible restrictions to flow, and in which the flow restrictor member is configured to displace relative to a seat of the variable flow restrictor without changing a respective restriction to flow in at least one of the discrete flow-permitting positions; and
a mass flowmeter connected in the bypass flow passage between the inlet and the outlet.

21. The flow measurement apparatus of claim 20,
in which the variable flow restrictor comprises first and second shoulders formed in a body of the variable flow restrictor, and
in which the variable flow restrictor has a first restriction to fluid flow with the flow restrictor member in contact with the first shoulder, and the variable flow restrictor has a second restriction to fluid flow with the flow restrictor member in contact with the second shoulder.

22. The flow measurement apparatus of claim 20, in which the variable flow restrictor has a first restriction to fluid flow with the flow restrictor member in a first position relative to the seat, and the variable flow restrictor has a second restriction to the fluid flow with the flow restrictor member in a second position relative to the seat.

23. The flow measurement apparatus of claim 22, in which an overlap of the seat with the flow restrictor member in the first position forms a first aperture having the first restriction to the fluid flow, and the overlap of the seat with the flow restrictor member in the second position forms a second aperture having the second restriction to the fluid flow.

24. The flow measurement apparatus of claim 20, in which the flow restrictor member comprises an opening formed through the flow restrictor member, the opening having multiple different flow areas configured to align with the main flow passage, each of the flow areas having a respective different level of restriction to the fluid flow through the variable flow restrictor.

25. The flow measurement apparatus of claim 24, in which the flow restrictor member is displaceable in the variable flow restrictor without changing at least one of the flow areas.

26. The flow measurement apparatus of claim 20, in which a section of the main flow passage comprises multiple parallel branches.

27. The flow measurement apparatus of claim 26, further comprising a flow control device connected in at least one of the branches.

28. The flow measurement apparatus of claim 27, in which the flow control device selectively permits and blocks fluid flow through the at least one of the branches.

29. The flow measurement apparatus of claim 28, in which the flow control device comprises a valve configured to block the fluid flow through the at least one of the branches in response to a decrease in a flow rate of the fluid flow.

30. The flow measurement apparatus of claim 20, in which the mass flowmeter comprises a Coriolis flowmeter.

31. The flow measurement apparatus of claim 20, in which the variable flow restrictor is connected in the bypass flow passage between the inlet and the outlet.

32. The flow measurement apparatus of claim 20, in which the variable flow restrictor is connected in the main flow passage between the inlet and the outlet.

* * * * *